United States Patent Office.

FRIEDRICH FISCHER, OF BARMEN, PRUSSIA, GERMANY.

VIOLET COLORING-MATTER.

SPECIFICATION forming part of Letters Patent No. 329,637, dated November 3, 1885.

Application filed July 29, 1885. Serial No. 172,980. (No specimens.)

*To all whom it may concern:*

Be it known that I, FRIEDRICH FISCHER, of the city of Barmen, in the Empire of Germany, have invented a new and useful Improvement in Coloring-Matters, of which the following is full, true, and accurate description.

My invention relates to the production of a new violet-dye. The violet dye-stuff is formed by the action upon diethyl-aniline of perchlormethylmercaptan, which is the product of the reaction of chlorine upon carbon disulphide.

In order to obtain my new violet-dye practically, I proceed as follows: Twenty parts perchlormethylmercaptan are slowly allowed to run into a mixture of forty-four parts diethyl aniline and ten parts of calcium carbonate contained in a kettle provided with a stirrer standing in a water bath, the mixture being constantly stirred and externally cooled. The green pulpy mixture that forms is constantly stirred and gradually heated during twelve hours to between 100° and 110° centigrade by elevating the temperature of the water bath by means of superheated steam. The reaction is shown by the molten character assumed by the original green pulpy mixture. At the end of the period above named the whole mass presents a melt of coppery luster, which is brittle when cold, and contains the already-formed violet dye-stuff which may be extracted by water. Purification and isolation of the dye-stuff may be effected in various ways. The whole melt is best dissolved in a small quantity of acidulated water filtered from resinous product decomposed by means of caustic-soda solution to liberate the bases, and the diethyl-aniline which has not entered into the reaction is then expelled by means of steam. The resulting base is converted into either hydrochloric, sulphuric, or oxalic acid salt by known methods. The new violet that results is of excellent purity and brilliancy.

I do not in this application claim the process herein described, having made a separate application therefor.

What I claim as my invention, and desire to secure by Letters Patent, is—

The violet coloring-matter herein described, having the properties specified.

In testimony whereof I have signed my name to this specification in the presence of two subscribing witnesses.

FRIEDRICH FISCHER.

Witnesses:
 HERM. MATTHIS,
 RICHARD LEKEBUSCH.